(12) United States Patent
Thorn

(10) Patent No.: US 10,314,294 B2
(45) Date of Patent: Jun. 11, 2019

(54) BIRD FEEDER

(71) Applicants: OAKTHRIFT CORPORATION LTD, Hertfordshire (GB); James John Thorn, Rochford (GB)

(72) Inventor: James John Thorn, Rochford (GB)

(73) Assignee: OAKTHRIFT CORPORATION, LTD., Borehamwood (GB)

( * ) Notice: Subject to any disclaimer, the term of this patent is extended or adjusted under 35 U.S.C. 154(b) by 107 days.

(21) Appl. No.: 15/115,625

(22) PCT Filed: Feb. 5, 2015

(86) PCT No.: PCT/GB2015/050310
§ 371 (c)(1),
(2) Date: Jul. 29, 2016

(87) PCT Pub. No.: WO2015/121622
PCT Pub. Date: Aug. 20, 2015

(65) Prior Publication Data
US 2017/0172112 A1    Jun. 22, 2017

(30) Foreign Application Priority Data
Feb. 12, 2014 (GB) .................................. 1402398.0

(51) Int. Cl.
*A01K 39/012* (2006.01)
*A01K 39/01* (2006.01)

(52) U.S. Cl.
CPC ........ *A01K 39/0113* (2013.01); *A01K 39/012* (2013.01)

(58) Field of Classification Search
CPC .......................... A01K 39/0113; A01K 39/012
(Continued)

(56) References Cited

U.S. PATENT DOCUMENTS 1,299,719 A * 4/1919 Harris .................. A01K 39/012
119/70
2,163,186 A * 6/1939 Bergeron ............. A01K 39/012
119/53

(Continued)

FOREIGN PATENT DOCUMENTS

CA          2330868 A1 *  7/2002  ......... A01K 39/0113
CA          2507546 A1 * 11/2006  ......... A01K 39/0113
(Continued)

*Primary Examiner* — Magdalena Topolski
*Assistant Examiner* — Morgan T Barlow
(74) *Attorney, Agent, or Firm* — Weiss & Moy, P.C.; Jeffrey D. Moy

(57) ABSTRACT

A hanging bird feeder comprises a hanging attachment that allows a user to hang the feeder, a feed reservoir, and a plurality of individual perches arranged around the periphery of the bird feeder and adjacent respective feed-dispensing openings. The feeder has a plurality of shrouds each connected to respective perches and the perches are biased to rest in a first position where their associated shrouds are not covering their respective openings. The perches are independently moveable under weight to a second position where their respective shrouds are covering their respective openings. The feeder has a plurality of pivoting members pivotally attached at first ends under the feed reservoir and having free ends that extend under respective perches. The perches are biased to rest in their first position by means of torsion springs acting on the pivoting members and located adjacent the first ends of respective pivoting members.

12 Claims, 7 Drawing Sheets

(58) Field of Classification Search
USPC ........................................................ 119/57.9
See application file for complete search history.

(56) References Cited

U.S. PATENT DOCUMENTS

| | | | | |
|---|---|---|---|---|
| 2,944,517 | A * | 7/1960 | Siggins | A01K 39/012 119/531 |
| 4,541,362 | A * | 9/1985 | Dehls | A01K 39/0113 119/57.9 |
| RE32,970 | E * | 7/1989 | Furlani | A01K 39/0113 119/52.3 |
| 5,048,461 | A * | 9/1991 | Wessner | A01K 39/0113 119/52.3 |
| 5,163,382 | A * | 11/1992 | Morrison | A01K 39/0113 119/57.9 |
| 5,289,796 | A * | 3/1994 | Armstrong | A01K 39/012 119/52.3 |
| 5,365,879 | A * | 11/1994 | Ying-Kuan | A01K 5/0114 119/476 |
| 5,406,908 | A * | 4/1995 | Burleigh | A01K 39/012 119/57.8 |
| 5,720,238 | A * | 2/1998 | Drakos | A01K 39/0113 119/57.9 |
| 5,722,344 | A * | 3/1998 | Rank | A01K 39/0113 119/52.2 |
| 5,947,054 | A * | 9/1999 | Liethen | A01K 39/0206 119/52.3 |
| 5,964,183 | A * | 10/1999 | Czipri | A01K 39/012 119/52.3 |
| 6,119,627 | A * | 9/2000 | Banyas | A01K 39/0113 119/52.3 |
| 6,578,518 | B1 * | 6/2003 | Conforti | A01K 39/012 119/52.3 |
| 6,945,192 | B2 * | 9/2005 | Cote | A01K 39/0113 119/57.9 |
| 7,886,695 | B2 * | 2/2011 | Held | A01K 5/0114 119/476 |
| 8,230,809 | B2 * | 7/2012 | Cote | A01K 39/012 119/531 |
| 8,807,081 | B1 * | 8/2014 | Gage | A01K 31/12 119/52.3 |
| D745,227 | S * | 12/2015 | Thorn | D30/127 |
| D811,013 | S * | 2/2018 | Thorn | D30/127 |
| D811,014 | S * | 2/2018 | Thorn | D30/127 |
| 2003/0136347 | A1 * | 7/2003 | Fasino | A01K 39/0113 119/57.9 |
| 2003/0226514 | A1 * | 12/2003 | Cote | A01K 39/0113 119/57.9 |
| 2005/0268858 | A1 * | 12/2005 | Zieff | A01K 39/0113 119/52.2 |
| 2008/0035065 | A1 * | 2/2008 | Towner | A01K 39/0113 119/57.8 |
| 2010/0326362 | A1 * | 12/2010 | Hepp | A01K 39/012 119/51.01 |
| 2012/0037080 | A1 * | 2/2012 | Hepp | A01K 39/0113 119/52.3 |
| 2015/0305311 | A1 * | 10/2015 | Murray | A01K 39/012 119/57.9 |
| 2015/0366168 | A1 * | 12/2015 | Cote | A01K 39/0113 119/52.2 |
| 2016/0113247 | A1 * | 4/2016 | McCord | A01K 39/0113 119/52.3 |
| 2017/0164585 | A1 * | 6/2017 | Cote | A01K 39/0113 |
| 2017/0172111 | A1 * | 6/2017 | Bowler | A01K 39/012 |
| 2017/0339927 | A1 * | 11/2017 | Cote | A01K 39/012 |

FOREIGN PATENT DOCUMENTS

| | | | | |
|---|---|---|---|---|
| CA | 2870348 | A1 * | 5/2016 | ........... A01K 39/012 |
| CH | 613603 | A5 * | 10/1979 | ........... A01K 39/012 |
| EP | 1854350 | A1 * | 11/2007 | ........... A01K 39/012 |
| EP | 3066919 | A1 * | 9/2016 | ......... A01K 39/0113 |
| FR | 2819985 | A1 * | 8/2002 | ......... A01K 39/0113 |

* cited by examiner

BIRD FEEDER

The present invention relates to a bird feeder.

Many people enjoy attracting birds to their garden by means of a birdfeeder. However, most people that feed birds have a preference for small songbirds instead of larger birds, such as pigeons. Further, there is a tendency to dislike feeding squirrels, which are largely considered pests.

Many bird feeders adapted to prevent the feeding of larger birds and squirrels have been proposed in the past. Examples of such feeders include U.S. Pat. Nos. 5,720,238, 4,541,362, US2008105206, 6,918,353, and US2002139311.

U.S. Pat. Nos. 2,965,070 and 5,048,461 provide feeders with individually operable shrouds at respective feed-dispensing openings such if a large bird or squirrel alights on a perch a closing mechanism operates so as to prevent feeding at that particular perch.

However, the mechanisms of such feeders are bulky and therefore inapplicable to hanging bird feeders.

The bird feeder of the present application represents an improvement on prior art feeders in that it provides for a hanging bird feeder that comprises individually operable shrouds.

According to a first aspect of the present invention there is provided a hanging bird feeder comprising:
 a hanging attachment that allows a user to hang the feeder;
 a feed reservoir;
 a plurality of individual perches arranged around the periphery of the bird feeder and adjacent respective feed-dispensing openings;
 a plurality of shrouds each connected to respective perches; wherein
 the perches are biased to rest in a first position where their associated shrouds are not covering their respective openings;
 the perches are independently moveable under weight to a second position where their respective shrouds are covering their respective openings; and further comprising
 a plurality of pivoting members pivotally attached adjacent first ends under the feed reservoir and having free ends that extend under respective perches; wherein
 the perches are biased to rest in their first position by means of torsion springs acting on the pivoting members and located adjacent the first ends of respective pivoting members.

The provision of pivoting members biased by torsion springs to urge perches towards a feeding position allows for a plurality of individually moveable perches to be located around the periphery a hanging bird feeder. Having the pivoting members attached adjacent first ends allows for a plurality of pivoting members to be attached to the bird feeder and operate without interfering with each other as the pivoting members may be arranged such that they extend away from each other. Furthermore, as the mechanisms are under the feed reservoir they do not interfere with the size of the reservoir and are easy to maintain as a user may have direct access to the mechanisms without dismantling the feeder.

In some embodiments pivoting members are housed within a lower housing portion.

By housing pivoting members in a lower housing portion the mechanism is protected from being interrupted or damaged by spilled bird food and weathering.

In some embodiments pivoting members extend into respective recesses formed in the underside of the respective perches.

By having pivoting members extend into a recess in the underside of a perch the mechanism is further protected.

In some embodiments torsion springs are located at the pivots of respective pivoting members.

In some embodiments a perch and its respective shroud are formed in one piece.

In some embodiments a perch and its respective shroud are formed separately and are mechanically connected.

In some embodiments the shrouds are slidably mounted on the bird feeder.

In some embodiments the perches are slidably mounted on the bird feeder.

In some embodiments perches are substantially equidistantly spaced around the periphery of the feeder.

In some embodiments the bird feeder is substantially cylindrical and the perches are substantially equidistantly spaced around the circumference of the feeder.

In order that the present invention may be more fully understood by way of example a specific embodiment will now be described with reference to the accompanying drawings, of which:

Figure 1:
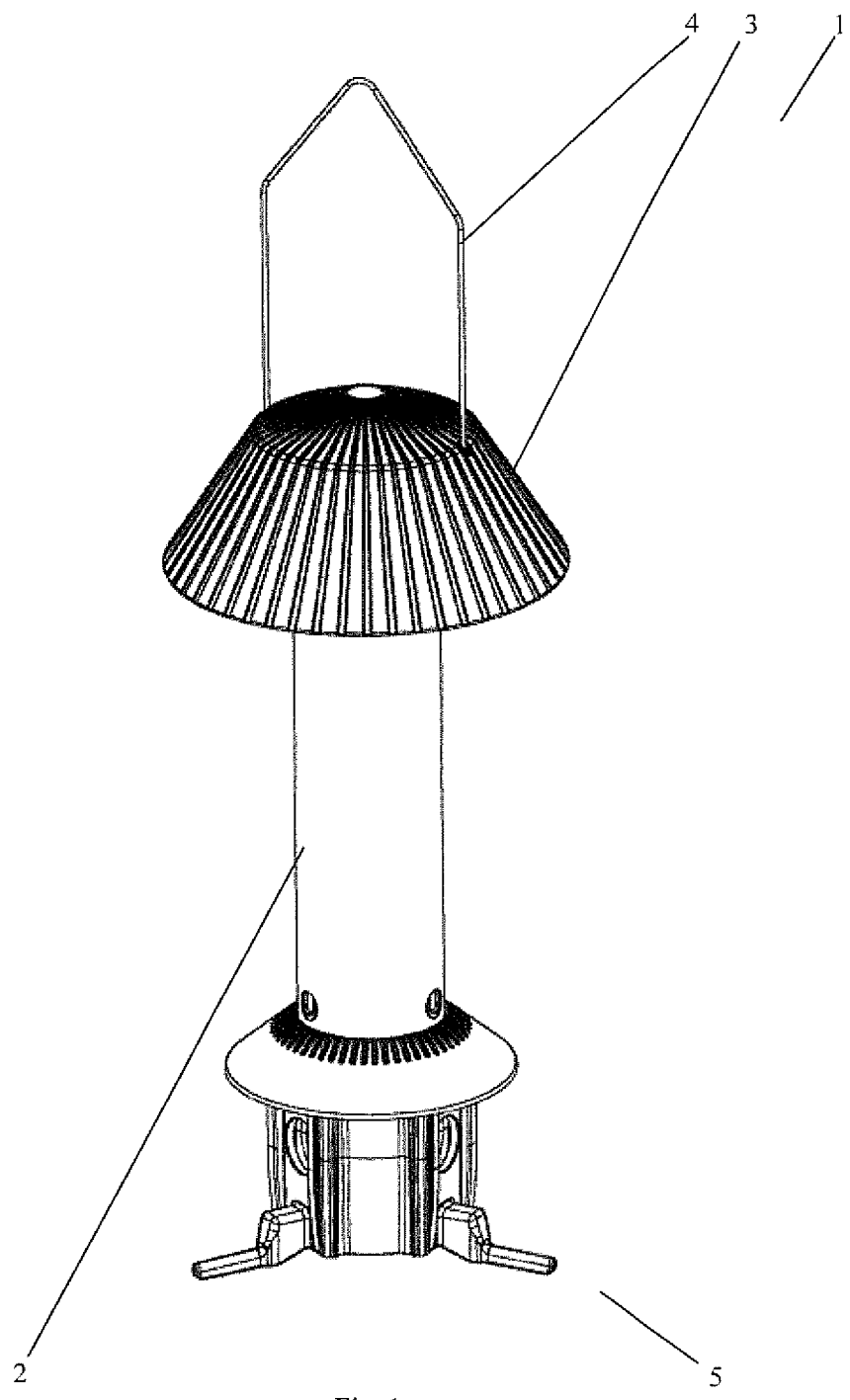
FIG. 1 is a perspective view of a bird feeder made in accordance with the present invention.

Referring to the drawings a bird feeder 1 comprises a feed reservoir 2 and an upper baffle 3 located above feed reservoir 2. Upper baffle 3 has a hook 4 to hang feeder 1. Feeder 1 further comprises a lower feed-dispensing portion 5 that is located beneath feed reservoir 2.

Upper baffle 3 is removable from feed reservoir 2 in order that a user may fill feed reservoir 2 with bird feed.

Feed reservoir 2, upper baffle 3 and hook 4 are of standard construction and will not be further described herein. However, it will be apparent that types of hanging attachment other than hook 4 may be provided so as to allow a user to hang the bird feeder. For example a chain or cord may be employed.

Figure 2:
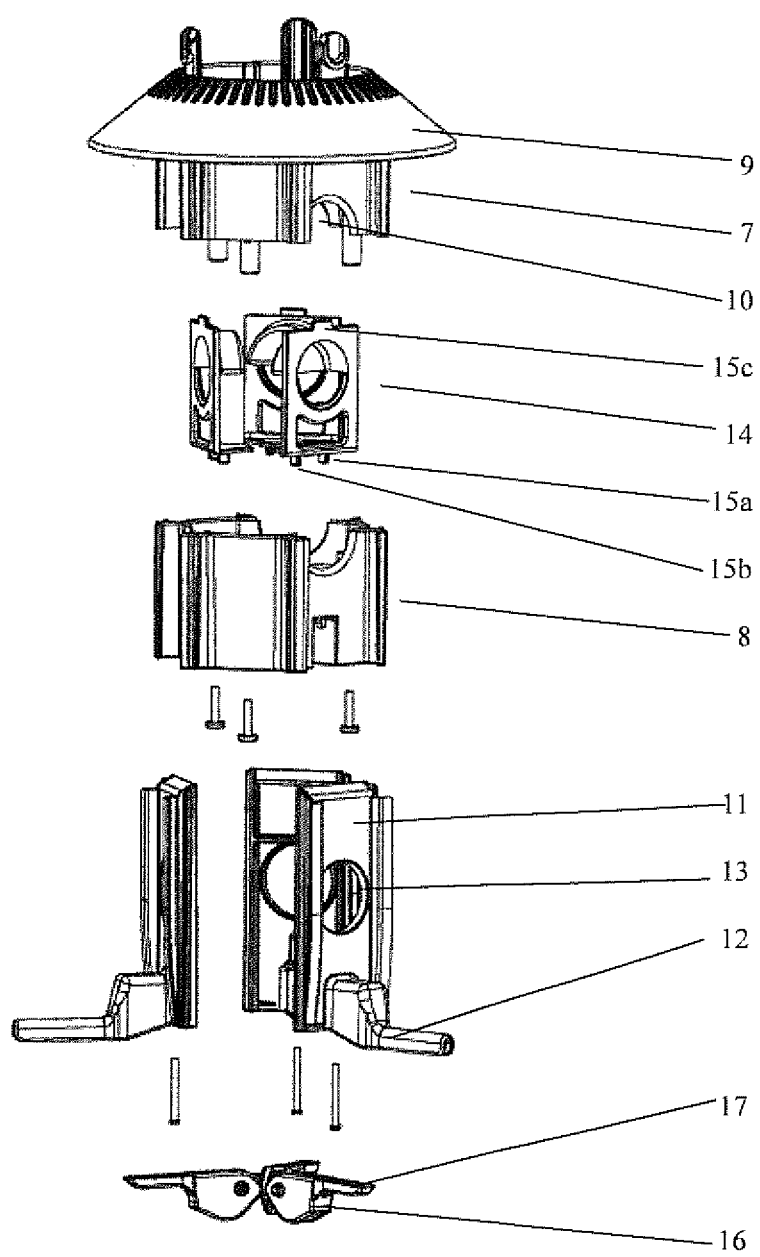
FIG. 2 is an exploded perspective view of the feed-dispensing portion of the feeder of FIG. 1.
Figure 3:
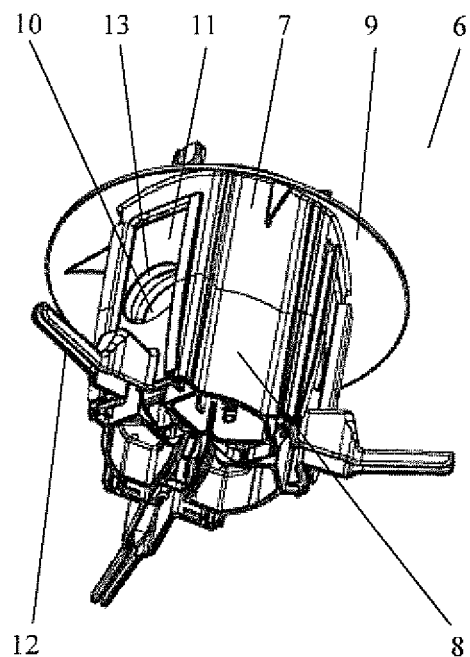
FIG. 3 is a perspective view of the underneath of the feed-dispensing portion of the feeder of FIG. 1.
Figure 4:
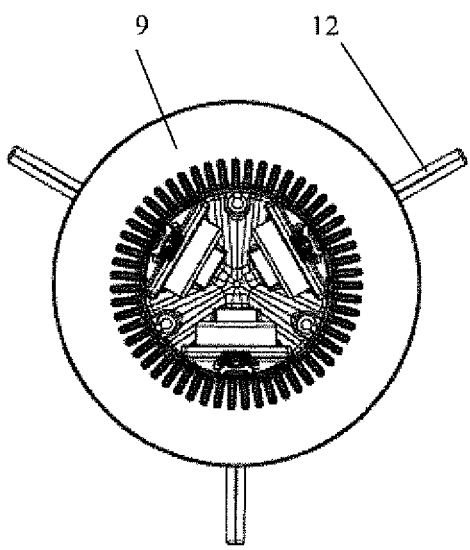
FIG. 4 is a plan view of the feed-dispensing portion of the feeder of FIG. 1.
Figure 5:
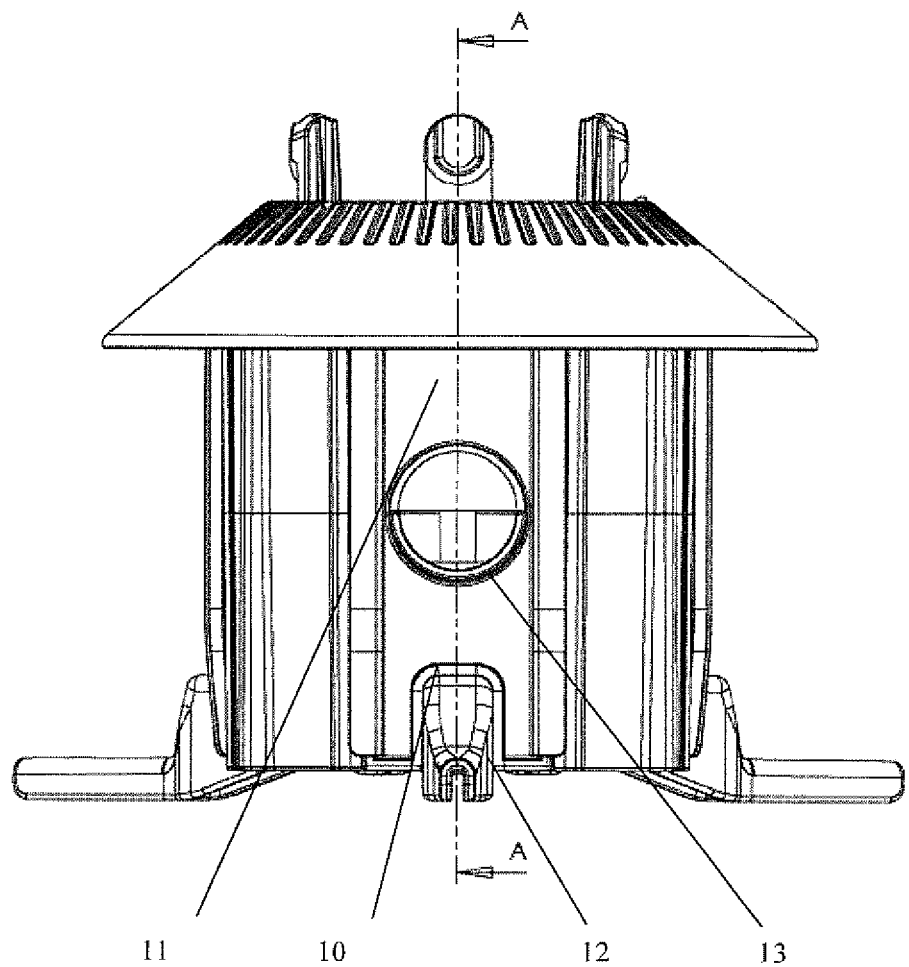
FIG. 5 is a side view of the feed-dispensing portion of the feeder of FIG. 1 wherein a perch is in a first position.
Figure 6:
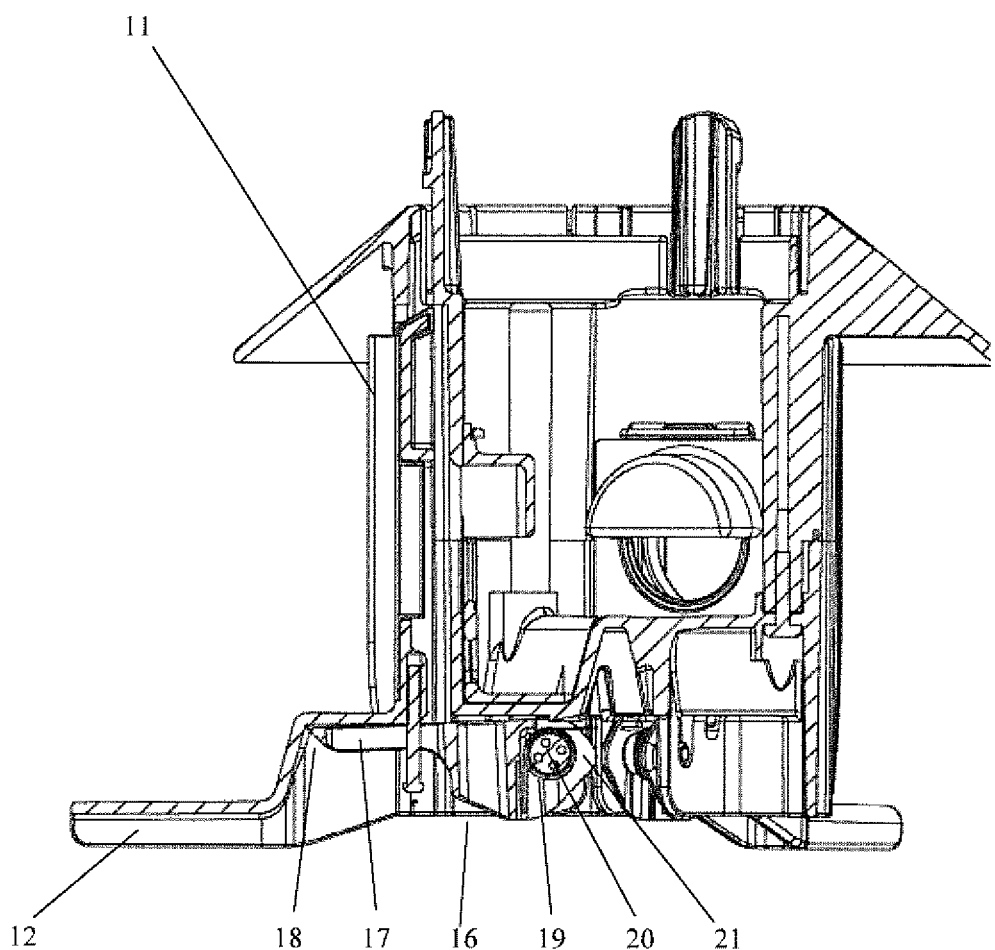
FIG. 6 is a cross-section through section A-A of the feed-dispensing portion of the feeder of FIG. 5.
Figure 7:
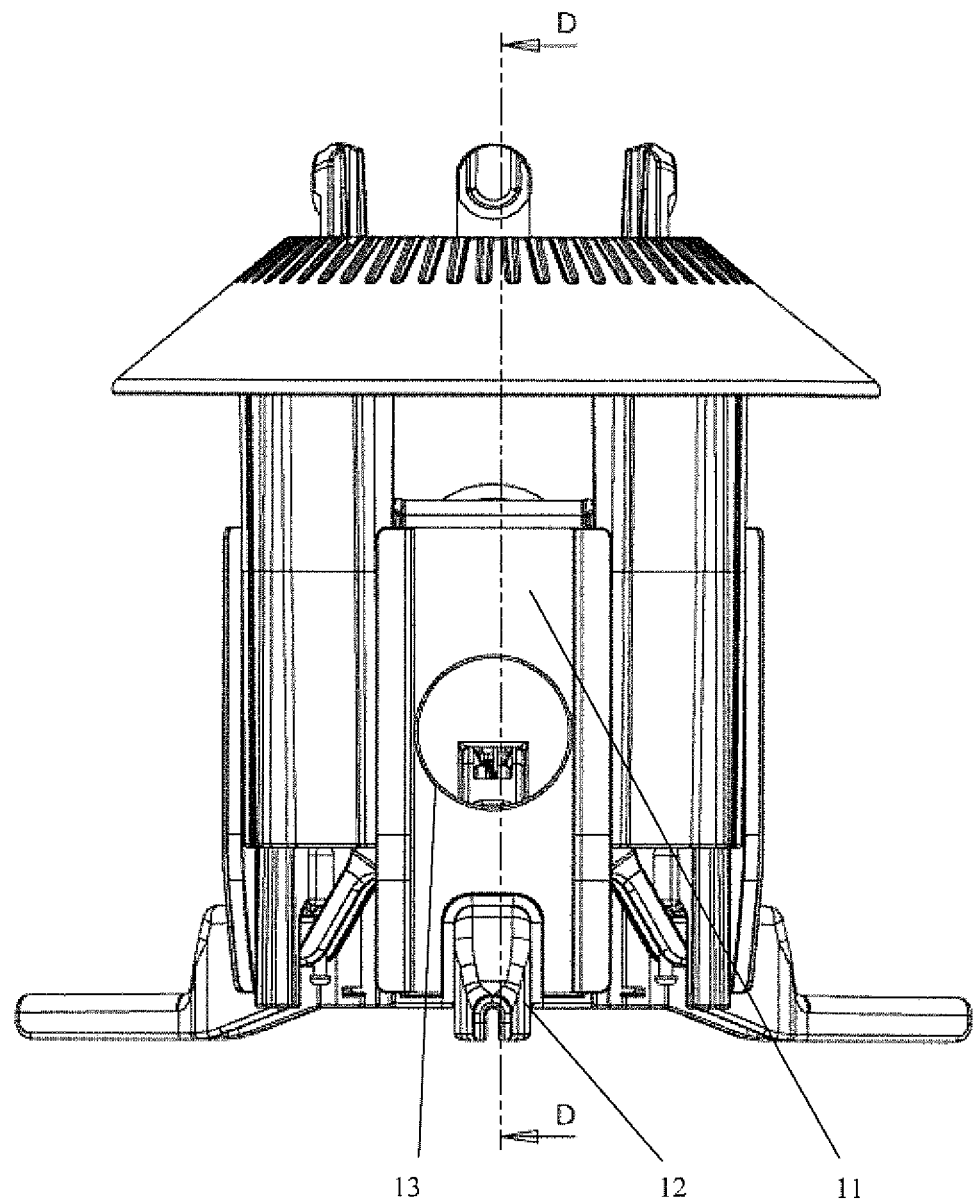
FIG. 7 is a side view of the feed-dispensing portion of the feeder of FIG. 1 wherein a perch is in a second position.
Figure 8:
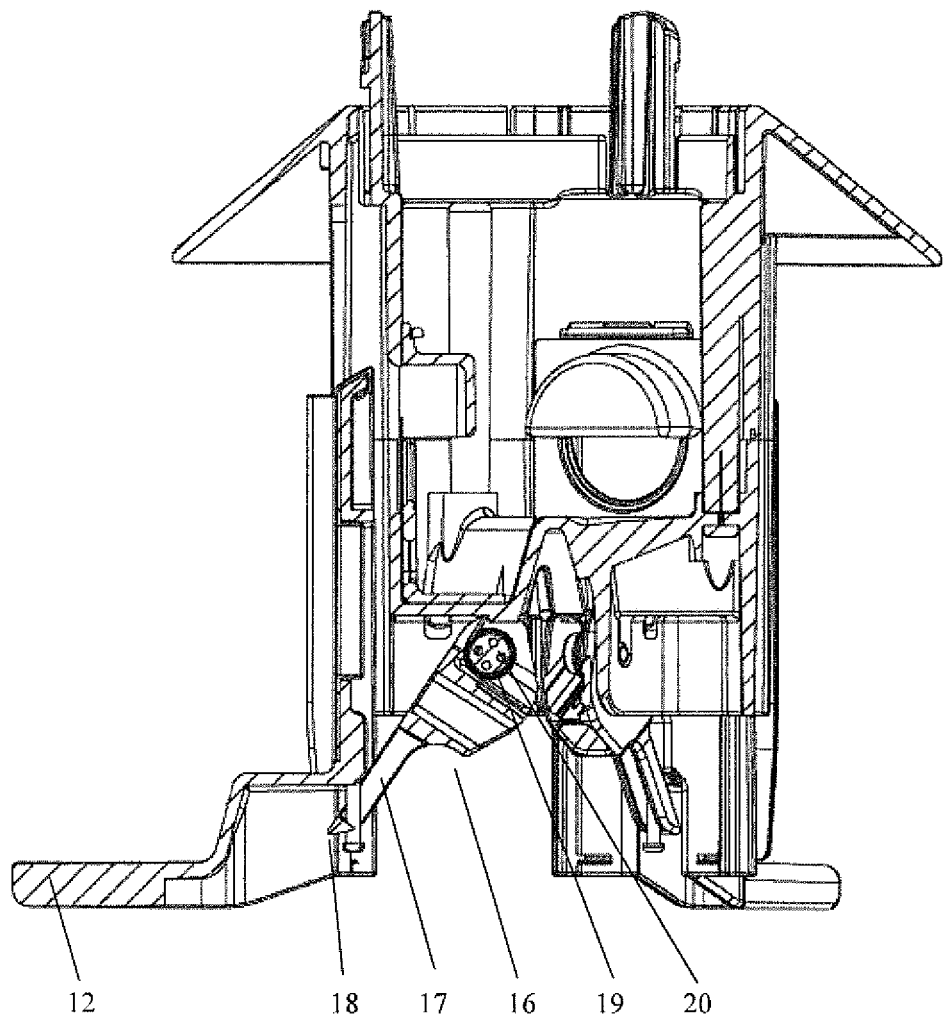
FIG. 8 is a cross-section through section D-D of the feed-dispensing portion of the feeder of FIG. 7.

Turning to FIGS. 2 to 8, feed-dispensing portion 5 comprises a main housing 6 formed of upper housing portion 7 and lower housing portion 8.

Upper housing portion 7 comprises the lower baffle 9 of bird feeder 1. Upper housing portion 7 is positioned above three feed-dispensing openings 10 (only one opening is labelled for clarity and brevity) that are formed in the wall of housing 6 and positioned equidistantly therearound.

Retained inside housing 6 at feed-dispensing openings 10 are respective feed-moderating egress pieces 14. Egress pieces 14 are retained at their respective openings 10 by means of projections 15*a*, 15*b*, 15*c* mating with corresponding recesses (not shown) formed in housing 6. It will be apparent, however, that any suitable method of retaining egress pieces 14 at respective openings 10 might be employed.

Slidably mounted on the exterior of housing 6 at seed dispensing openings 10 are respective shrouds 11. Shrouds 11 are substantially rectangular and comprise a central feed-dispensing aperture 13.

Extending substantially perpendicularly from shrouds 11 are perches 12. Perches 12 extend adjacent the base of shrouds 10 such that they are below feed-dispensing apertures 13 when feeder 1 is in use. One perch 12 extends from each shroud 11 and each perch comprises a recess in its underside.

Shroud 11 and perch 12 units are moveable between a first position (shown in FIGS. 5 and 6) wherein feed-dispensing apertures 13 are aligned with respective openings 10 and a second position (shown in FIGS. 7 and 8) wherein feed-dispensing apertures 13 are not aligned with respective openings 10 and instead shrouds 11 cover their respective openings 10 thereby preventing any feed from being dispensed from bird feeder 1.

Biasing shroud 11 and perch 12 units towards a first position where feed-dispensing apertures 13 are aligned with respective openings 10 are respective props 16.

Props 16 are pivotally attached adjacent their first ends 21 to lower housing portion 8 of main housing 6. Props 16 comprise an elongate projection 17 with a free end 18 that terminates in the recess in the underside of its respective perch 12.

Props 16 are housed radially in a recess formed on the underside of lower housing portion 8, with their first ends 21 adjacent each other around the longitudinal axis of bird-feeder 1.

Props 16 bias shroud 11 and perch 12 units to their first position by means of respective torsion springs 19 located at respective pivots 20 of props 16, which act via elongate projections 17 to apply force to the underside of respective perches 12.

Torsion springs 19 are of sufficient strength to maintain shroud 11 and perch 12 units in their first position when a small bird has alighted on perch 12.

However, torsion springs 19 are not capable of maintaining shroud 11 and perch 12 units in their first position under the weight of a large bird or squirrel. Instead, when a large bird or squirrel alights on a perch 12 it, along with its associated shroud 11 moves to its second position wherein shroud 11 covers its respective opening and feed may not be dispensed from the respective feed-dispensing opening 10.

In order that a user may adjust the sensitivity of the mechanism such that it operates at a desired weight of bird a plurality of torsion springs of different strengths may be provided. Thus as torsion springs 19 are accessible via the underside of main housing 6 a user may replace the springs with different springs of a desired strength.

Many variations are possible without departing from the scope of the present invention as set out in the appended claims.

The invention claimed is:

1. A hanging bird feeder comprising
a hanging attachment that allows a user to hang the bird feeder;
a feed reservoir coupled to the hanging attachment;
a plurality of feed dispensing openings formed around a periphery of the feed reservoir;
a plurality of individual perches arranged around a periphery of the bird feeder;
a plurality of shrouds movable on the feed reservoir;
wherein each of the plurality of feed dispensing openings has an associated individual perch of the plurality of individual perches located adjacent to the corresponding feed dispensing opening and an associated individual shroud of the plurality of shrouds movable to one of cover or expose the-corresponding feed dispensing opening;
wherein the associated individual perch is biased to rest in a first position where the associated individual shroud exposes the corresponding feed dispensing opening;
wherein the associated individual perch is independently movable to a second position where the associated individual shroud is covering the corresponding feed dispensing opening when weight in excess of a predetermined value is applied to the associated individual perch; and
a plurality of pivoting members, wherein each of the plurality of pivoting members has a pivotally attached adjacent first end under the feed reservoir and extends radially towards a free end that extends under an individual one of the plurality of individual perches applying force to an underside of the individual one of the plurality of individual perches;
wherein each of the plurality of individual perches is biased to rest in the first position by means of a torsion spring acting on a respective pivoting member;
wherein each of the plurality of individual perches extends perpendicularly to the associated individual shroud, each torsion spring allowing the respective pivoting member to move a corresponding perch, the corresponding perch remaining horizontal as the corresponding perch moves vertically down the bird feeder.

2. The bird feeder of claim 1 wherein the pivoting members are housed within individual recesses formed in a lower housing portion of the bird feeder.

3. The bird feeder of claim 1 wherein each of the plurality of pivoting members extend into respective recesses formed in an underside of a respective individual perch of the plurality of individual perches.

4. The bird feeder of claim 1 wherein each torsion spring is located at a pivot of the respective pivoting member.

5. The bird feeder of claim 1 wherein the associated individual perch of the plurality of individual perches and the associated individual shroud of the plurality of shrouds are formed in one piece.

6. The bird feeder of claim 1 wherein the associated individual perch and the associated individual shroud are formed separately and are mechanically connected.

7. The bird feeder of claim 1 wherein each of the plurality of shrouds are slidably mounted on the bird feeder.

8. The bird feeder of claim 1 wherein each of the plurality of perches are slidably mounted on the bird feeder.

9. The bird feeder of claim 1 wherein the plurality of perches are equidistantly spaced around the periphery of the bird feeder.

10. The bird feeder of claim 1 wherein the bird feeder is cylindrical and the plurality of perches are equidistantly spaced around the circumference of the bird feeder.

11. The bird feeder of claim 1 wherein the plurality of perches is at feast three all equidistantly spaced around the circumference of the bird feeder.

12. The bird feeder of claim 1 wherein the bird feeder is cylindrical, the plurality of perches is at least three all equidistantly spaced around the circumference of the bird feeder.

* * * * *